Jan. 11, 1966  R. N. ROWE  3,229,066
CENTER-FED FUSIBLE BUSWAY PLUG
Filed June 28, 1963
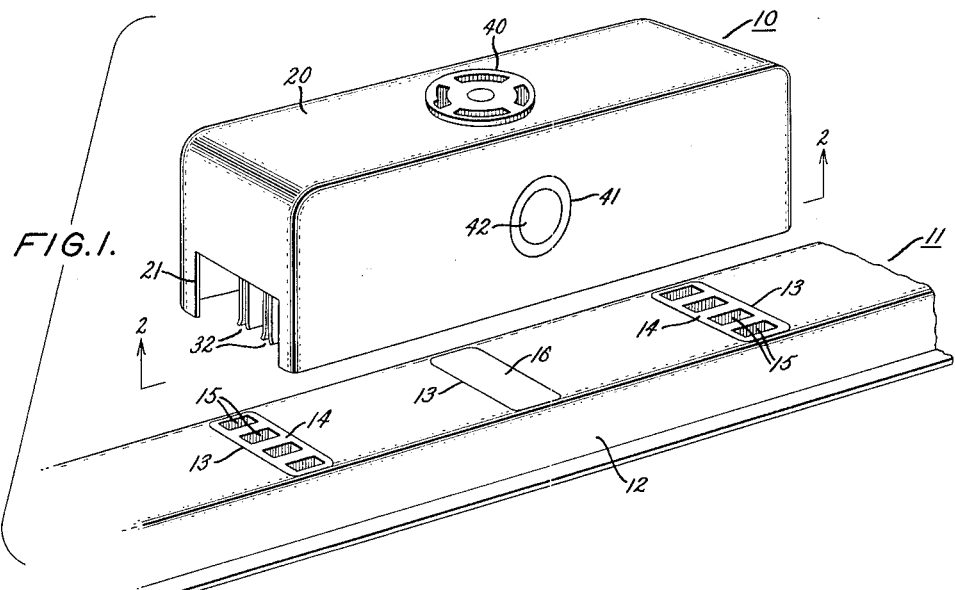
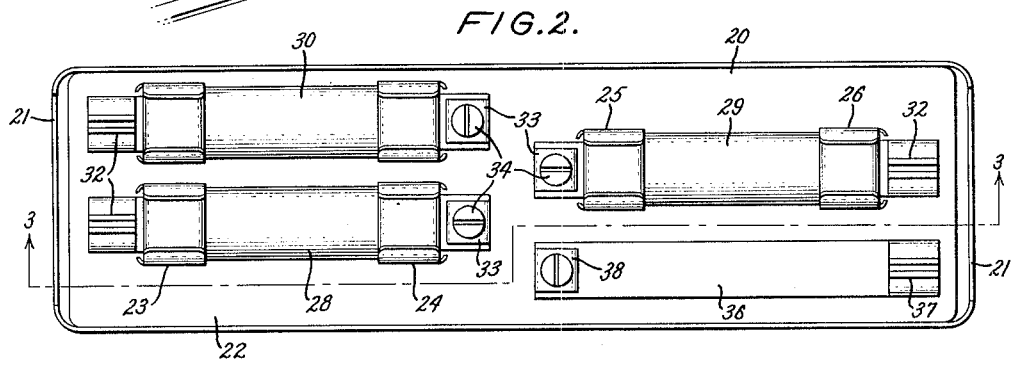
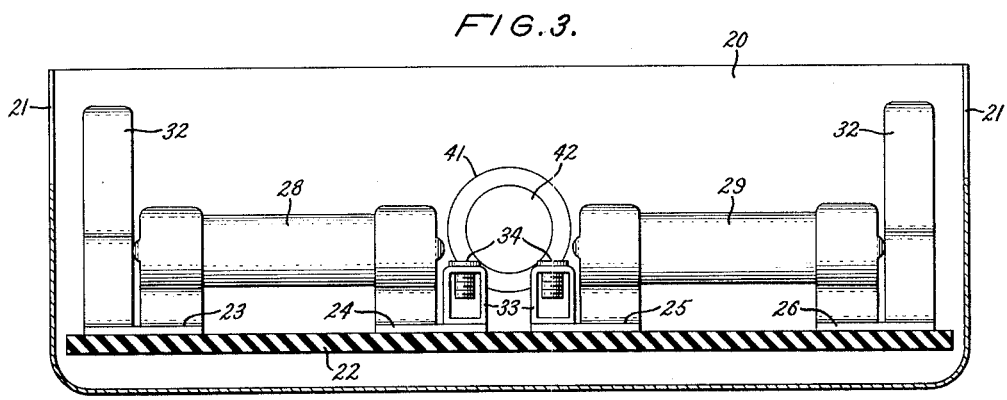
INVENTOR:
RAYMOND N. ROWE,
BY J. Wesley Haubner
ATTORNEY.

United States Patent Office 3,229,066
Patented Jan. 11, 1966

3,229,066
CENTER-FED FUSIBLE BUSWAY PLUG
Raymond N. Rowe, Wakefield, R.I., assignor to General
Electric Company, a corporation of New York
Filed June 28, 1963, Ser. No. 291,316
2 Claims. (Cl. 200—133)

This invention relates generally to a power outlet for an electrical distribution system of the busway type and more specifically to an improved busway plug which may house circuit elements such as circuit interrupter devices.

More specifically this invention relates to a busway plug intended for use on a physically small busway having a rating of approximately 60 amperes and in the range of 250 to 600 volts. In the past, busway plugs have been constructed and arranged to house circuit interrupter devices, such as fuses. However, a problem has been encountered when these plugs have been used on physically small busways for three wire or four wire distribution systems. In these plugs, the circuit interrupting devices are arranged in conventional side by side relationship. This arrangement, in order to accommodate a protective element for each wire, requires a plug housing the width of which considerably exceeds the width of the busway. This gives rise to interference problems in many installations. For example, in installations wherein busways and busway plugs are installed in restricted spaces incapable of accommodating excessively wide busway plugs, the circuit protective devices must be located remote from the busway plug. It is advantageous to have the protective devices located at the plug. With this arrangement when loads requiring greater or less protection are connected to the busway, a protective device of appropriate capacity is automatically plugged in with the load. Inadvertent connection of a load to a distribution system having a protective device of improper operating range is thereby averted.

It is therefore an object of the invention to provide a novel and improved busway plug which houses the necessary circuit protective devices.

It is another object of the invention to provide a novel and improved busway plug for multiphase busway distribution systems in which circuit protective devices are so arranged on the plug that the width of the plug housing is no greater than the width of the busway housing.

A more specific object of the invention is the provision of a busway plug for housing a plurality of circuit protective devices in which the length of the plug is sufficient to provide for mounting a portion of the circuit protective devices in side by side relationship at one end and the remaining circuit protective devices at the opposite end so that all of the protective devices may be housed within the plug without causing the width of its housing to exceed the width of the busway housing.

Briefly stated, in accordance with one aspect of the invention, a busway plug is provided having a long narrow box-like housing with an insulating base member disposed within the housing generally parallel to its longitudinal axis. The base member supports a plurality of elongated fuse support members having a length somewhat less than half the length of the plug housing. The longitudinal axis of each of the fuse support members is in general longitudinal alignment with the longitudinal axis of the housing. A portion of the elongated fuse support members are mounted side by side at one end of the base member and the remainder is mounted at the other end. With this arrangement the width of the plug housing is kept from exceeding the width of the housing of the busway on which the plug is to be used. The fuse support members at one end are arranged in staggered relationship with respect to those at the other end. The stab members are arranged at the same ends with the fuses to which they are connected. Thus a portion of the stabs are at one end of the plug housing and the remainder is at the other end. This arrangement simplifies the problem of electrical clearances. Load connections are made at the center of the plug.

While the specification concludes with claims particularly pointing out and distinctly claiming the subject matter which is regarded as the invention, it is believed the invention will be better understood from the following description taken in connection with the accompanying drawings in which:

FIG. 1 is a perspective view of the invention shown in relation to a cooperating busway;

FIG. 2 is a sectional view of the invention taken along line 2—2 of FIG. 1 with some parts shown in elevation; and FIG. 3 is a sectional view taken along line 3—3 of FIG. 2 with some parts shown in elevation.

Referring to the drawings, and in particular to FIG. 1, a busway plug 10 is shown with a busway 11. The busway 11 comprises an outer housing 12 which has a plurality of access openings 13 spaced along the top wall thereof. Each of the openings 13 is constructed to receive a receptacle member 14 of insulating material which has outer dimensions esesntially equivalent to the dimension of the associated opening 13. The receptacle member 14 has a plurality of contact openings 15 adapted to receive stab connecting means extending from the busway plug 10 such as shown at 32. Each of the openings 15 is aligned with an electrical conductor (not shown) longitudinally disposed within the busway housing 12. As the plug is plugged in to the busway, the stab connecting means 32 extending from the busway plug 10 pass through the openings 15 to engage the electrical conductors disposed within the housing 12. The openings 13 are conveniently spaced along the busway 12 so that members 14 may be inserted to provide plug receptacles at desired locations along the busway. Since loads will be connected to the busway 11 by means of the plug 10 at infrequent intervals, knockout plugs or other convenient covers 16 are provided for the openings 13 which are not being used at any given time.

Referring now more particularly to FIGS. 2 and 3 of the drawing taken in connection with FIG. 1, the plug 10 comprises a housing 20 which is of box-like configuration having one open wall along its length. A recess 21 is provided at each end of the housing 20 to allow the housing 20 to partially receive the busway housing 12 as the plug 10 is connected to the busway 11. It should be noted at this point that the immediately aforementioned arrangement is not an essential part of the invention and, as will be noted as the description continues, it would be entirely feasible to close the aforementioned open wall with an insulative member (not shown) with the only requirement being that the stab connecting means extend outwardly beyond this insulative member. Disposed within the housing 20 is an insulative base 22 which lies in a plane parallel to the aforementioned open wall. Carried on the insulative base 22 are a plurality of support members such as shown at 23, 24, 25 and 26. The support members 23, 24, 25 and 26 are arranged in cooperative pairs so that each pair carries a circuit interrupter device such as a fuse 28 or 29. It should be noted, however, that other circuit interrupter devices such as mechanical circuit breakers (not shown) could be carried by the support members.

Since the pairs are essentially identical with each other, only one pair will be described in detail. Taking, for example, the pair of supports 23 and 24 it will be noted that a stab connecting means 32 is provided in physical and electrical contact with the support 23. The connecting means 32 can be of any conventional type and it should be understood for purposes of illustration only, a stab-type connector is shown. The only requirement regarding the connecting means 32 is that it be adapted to cooperate with the contact opening 15 to electrically engage the conductor in connection with the opening 15. In physical and electrical contact with the support member 24 is a load connecting terminal means 33 which again may be of any conventional type. In the preferred embodiment shown in FIGS. 2 and 3, the load connecting terminal means 33 comprises a threaded stationary member which receives a screw 34 to secure an electrical conductor thereto.

Also shown in FIG. 2 is an electrical conductor 36 positioned in a manner similar to the aforementioned support members. The conductor 36 is provided with a stab connecting means 37 at one end thereof and a load connecting terminal means 38 at the opposite end thereof, both of these latter elements being positioned and arranged in a manner similar to the respective elements of the aforementioned support members.

In order to provide a circuit protective device for each of the power lines of the four-wire electrical distribution system illustrated in FIG. 1, the respective circuit protective device support members, as well as the conductor 36, are positioned in a unique manner to be described.

As shown, the stab connecting means, such as 32 and 37, are transversely spaced with relation to each other an amount equal to the spacing of the contact openings 15 in the busway duct 12. If the busway conductors are widely spaced, no problem is encountered with regard to aligning the stab connecting means of the plug with the individual busway contact openings. However, as mentioned earlier, there are many instances when it is desirable to have the busway electrical conductors spaced close together so that the overall width of the busway is small enough to be installed in a restricted area, but at the same time, circuit protective devices of comparatively large physical size are to be employed therewith. In such a case, if the circuit protective devices were positioned side by side in the busway plug as is common in the art existing today, the busway plug would of necessity be somewhat greater in width than the busway duct.

FIG. 2 illustrates the structural arrangement of the invention obviating excessive plug width wherein the circuit protective devices 28, 29 and 30 and the conductor 36 are positioned in a staggered arrangement with the circuit protective devices 28 and 30 positioned in close side by side relationship near one end of the plug housing 20 while a third protective device 29 and the conductor 36 are positioned in close side by side relationship near the opposite end of the plug housing 20. In addition to positioning pairs of elements near opposite ends of the housing 20, the axes of the elements are aligned in register with respective busway conductor contacts when the plug 10 is connected to the busway 11.

With the arrangement as shown in FIG. 2, i.e., with transversely successive electrical elements being disposed near respective opposite ends of the housing 20, the individual elements are kept in alignment with their respective busway contact openings 15 without necessitating a busway plug width in excess of the busway width.

As illustrated in FIGS. 2 and 3, load connections are made at the center of the plug by suitable means such as the load connecting terminals 33 for the fuse supports and the load connecting terminal 38 for the neutral conductor 36. Other devices such as a receptacle 40 and plug or a switch may be included in the plug 10 for load connection purposes. Openings 41 are also provided on the side walls of the plug housing 20 to accommodate a plurality of female plugs similar to 40 just mentioned. A knockout cover 42 is provided for the opening 41 in the event that a plurality of female plugs 40 are not desired.

As will be evident from the foregoing description, certain aspects of the invention are not limited to the particular details of construction of example illustrated, and it is contemplated that various and other modifications or applications will occur to those skilled in the art. It is therefore intended that the appended claims shall cover such modifications and applications as do not depart from the true spirit and scope of the invention.

What I claim as new and desire to secure by Letters Patent of the United States is:

1. A busway plug comprising:
   (a) an elongated housing having first and second end portions,
   (b) a plurality of wire-connecting terminals supported in said housing at a generally central portion thereof,
   (c) a first fuse-connecting terminal supported in said housing adjacent each of said wire-connecting terminals respectively and between said wire-connecting terminal and one of said end portions,
   (d) a second fuse-connecting terminal supported in said housing in longitudinally spaced relation to each of said first fuse-connecting terminals respectively to provide with said first terminals a plurality of elongated fuse-receiving sockets,
   (e) at least one of said fuse-receiving sockets extending from said central portion toward said first end of said housing and at least one of said sockets extending from said central portion toward said second end of said housing,
   (f) said housing having an opening adjacent said central portion for admitting conductors to said wire-connecting terminals,
   (g) a contact stab connected to each of said second fuse-connecting terminals at said first and second end portions of said housing respectively.

2. A busway plug comprising:
   (a) an elongated housing having first and second end portions,
   (b) a first pair of wire-connecting terminals supported in said housing at one side of and closely adjacent to a line dividing said housing into two substantially equal longitudinal portions,
   (c) a second pair of wire-connecting terminals supported in said housing at the side of said line opposite said one side,
   (d) a first fuse-connecting terminal supported in said housing adjacent each of said first pair of wire-connecting terminals and supported adjacent one of said second pair of wire-connecting terminals and between each of the respective wire-connecting terminals and the nearest adjacent end portion of said housing,
   (e) a second fuse-connecting terminal supported in said housing in longitudinally spaced relation to each of said first fuse-connecting terminals respectively to provide three elongated fuse-receiving sockets, two of said sockets extending from said central portion of said housing toward said first end portion and the third of said sockets extending from said central portion toward said second end portion of said housing, (f) a stab type electrical connector connected to each of said second fuse terminal members for connecting said terminal members to busbars of an electrical busway system, and (g) said housing having an opening generally centrally thereof for admitting conductors to said wire-connecting terminals.

References Cited by the Examiner

UNITED STATES PATENTS

| 2,124,269 | 7/1938 | Anderson | 317—120 |
| 3,142,738 | 7/1964 | Friedman | 200—133 |

FOREIGN PATENTS

| 8,535 | 3/1909 | Great Britain. |

BERNARD A. GILHEANY, *Primary Examiner.*

H. B. GILSON, *Assistant Examiner.*